United States Patent
Burnett et al.

(10) Patent No.: US 6,579,920 B2
(45) Date of Patent: Jun. 17, 2003

(54) FRICTION PADS AND DISKS AND COMPOSITIONS AND METHODS FOR PRODUCING SAME

(75) Inventors: David Burnett, Royal Oak, MI (US); Robert Schleifstein, Edison, NJ (US)

(73) Assignee: Prizmalite, New York, NY (US)

( * ) Notice: Subject to any disclaimer, the term of this patent is extended or adjusted under 35 U.S.C. 154(b) by 0 days.

(21) Appl. No.: 09/897,544

(22) Filed: Jul. 2, 2001

(65) Prior Publication Data

US 2003/0013782 A1 Jan. 16, 2003

(51) Int. Cl.⁷ .................................................. C08J 5/14
(52) U.S. Cl. .................... 523/149; 524/156; 260/998.13
(58) Field of Search ................................ 523/149, 150, 523/152, 153, 155, 156, 157, 158; 260/998.13

(56) References Cited

U.S. PATENT DOCUMENTS 5,891,933 A    4/1999  Kesavan et al. ............. 523/158
5,977,004 A  * 11/1999  Hogashi et al. ............. 501/136

FOREIGN PATENT DOCUMENTS

| EP | 834469 A1 | * | 4/1998 |
| EP | 856489 A1 | * | 8/1999 |
| JP | 10279924 A2 | * | 10/1998 |

* cited by examiner

Primary Examiner—Edward J. Cain
Assistant Examiner—Katarzyna W. Lee
(74) Attorney, Agent, or Firm—Perman & Green, LLP

(57) ABSTRACT

The addition of microspheres of barium titanate glass to conventional friction compositions for molding automotive and other brake elements and similar friction elements, results in substantial new and unexpected improvements with respect to the production of and processing of uniform, homogeneous molding compositions for forming the present friction elements. The formed friction pads, disks etc., have unexpectedly improved performance properties such as heat dissipation properties leading to improved, reduced wear over prolonged periods of use. The $BaTiO_3$ microspheres have an average diameter up to about $70\mu$, most preferably between about, $10$–$35\mu$

20 Claims, No Drawings

FRICTION PADS AND DISKS AND COMPOSITIONS AND METHODS FOR PRODUCING SAME

BACKGROUND OF THE INVENTION

1. Field of the Invention

The present invention relates to novel compositions for producing novel friction elements, such as pads and disks for automotive brakes or clutches. Such friction pads and disks have an engagement surface which is spaced from a rotating mating brake or clutch plate surface and which is designed to be pressed into engagement therewith, such as by activation of a brake pedal or a clutch pedal, to slow the rotation gradually, by frictional slippage, until the rotation is stopped. This action causes the friction pads or disks to convert the kinetic energy of the rotating brake surface, such as a brake drum or wheel rotor, or a clutch plate, into heat and to absorb the heat and gradually dissipate the heat into the atmosphere. The conventional friction pads and disks have good wear-resistance properties at low temperatures, but once the pad temperature increases to above about 200° C., the extent of wear increases exponentially with increasing temperature. This is due to thermal degradation of the organic components of the pad composition, such as organic fiber filler materials and organic resin binder materials. While friction pads and disks are intended to wear and be replaced, it is desirable to provide improved friction compositions having increased wear resistance properties under normal use conditions, thereby extending the useful life of the friction elements made thereof and reducing the replacement requirements and expense.

2. State of the Art

It is known to incorporate friction materials which operate at higher temperatures into friction compositions, such as ceramic metal (cermet) materials and carbon materials. However, these materials also have wear rates which substantially increase at elevated temperatures, and they are relatively heavy.

It is also known to incorporate property modifiers into friction compositions for a variety of reasons, including abrasive fillers such as alumina, silicon carbide and kyanite in fine particle sizes. These additives modify the properties of the friction composition but do not substantially increase the heat-dissipation properties or reduce the wear properties at elevated temperatures.

Friction material compositions currently used in clutch and brake linings for vehicles, motors and other machinery must be capable of withstanding severe operating temperatures and high pressure experienced during repeated applications. In addition the materials must have a surface coefficient of friction suitable to the requirements of the application and must have wear properties to balance the cost of their use and avoid undesirable side effects such as glazing, squeak, fade and grooving in the mating surfaces. Compositions in general use comprise a thermoset binder exemplified by phenolic molding compositions, or novolak resins, a fibrous reinforcement to prevent physical degradation and deterioration in performance, various fillers and other additives including wear modifiers, lubricants friction modifiers and the like.

Asbestos-free friction materials having exceptional performance may be made using clay, for example one selected from the group attapulgite, sepiolite and mixtures thereof, a non-asbestos fibrous reinforcement and conventional additives such as wear modifiers and lubricants. The non-asbestos fibrous reinforcing material may be steel wool, glass fiber, spun mineral fiber, aramid fiber, or the like, and provides cohesiveness and strength.

It has been proposed to add titanium salts to friction compositions as friction stabilizers, and reference is made to U.S. Pat. No. 5,891,933 which mentions the prior use of alkali metal hexatitanates and octatitanates which are acicular crystalline, and the use of alkali metal and alkaline earth titanates which are disclosed to be equally efficacious but not acicular or needle-like in structure and therefore possibly safer than the acicular crystalline titanates. The only titanates specifically disclosed are sodium titanate, potassium titanate and calcium titanate, and potassium titanate and calcium titanate, and they are preferably used in the form of a frit or powder but may also be used in the form of fibers or platelets. The titanate additives are said to provide friction materials which exhibit higher and more stable coefficients of friction during use. Barium titanate is not disclosed nor is there any suggestion of using the titanates in the form of beads or microbeads having sizes below about 70 $\mu$. Moreover there is no suggestion that the addition of titanate salts substantially increases the heat-dissipation properties of the friction elements to provide cooler operation and extended wear.

Conventional friction compositions are mixed to form uniform blends, and poured or otherwise injected into a suitable mold. The ingredients may be dry mixed (some phenolic resins are available as powders) and molded under pressure and heat using conventional techniques and conditions to form the brake pad or friction material. Phenolic resin may be present in amounts ranging from about 10–40% by weight. In general the percentage of non-asbestos fibrous reinforcement, such as steel wool, may vary from 10–50% by weight and the percentage of attapulgite or other polygorskite clay may vary from about 10% to 35% by weight. The attapulgite and steel wool may range from 20–60% by weight as a combination. The proportion of attapulgite to steel wool or other non-asbestos fiber in the combination may vary widely but generally may be in the range of about 1:3 to 3:1. Especially good results are achieved with 1:1 ratio. The percentage of graphite or other wear modifiers may range up to 20%, but the 5–10% range is typically adequate. The filler material barytes, are a common inexpensive filler material of high density and desirable inertness with good thermal and friction properties. Other filler material such as iron oxide, sponge iron particles, or scavengers such as brass or tin filings may be included in the formulation. Proprietary materials or other materials may be added as desired end results and formulations can vary widely with respect to ingredients and amounts. For example, conventional lubricants or other special wear modifiers may be added to the asbestos-free formulations of the present invention in order to achieve the desired wear properties. Other materials such as polymeric fibers, for example aramid fiber having a combination of wear reducing and reinforcing properties, may be particularly desirable.

SUMMARY OF THE INVENTION

The present invention is based upon the discovery that the addition of microspheres of barium titanate glass to conventional friction compositions for molding automotive and other brake pads, brake disks, clutch pads and similar friction elements, results in substantial new and unexpected improvements with respect to the production of uniform, homogeneous molding compositions for forming the friction pads, disks, etc., and with respect to the production of friction pads, disks, etc., which have unexpectedly improved performance properties such as heat dissipation properties leading to improved, reduced wear over prolonged periods of use.

DETAILED DESCRIPTION OF THE INVENTION

According to the present invention conventional curable friction compositions, such as but not limited to the prior art compositions discussed above, can be substantially improved with respect to dispersion to form uniform, homogeneous, pourable, dry, curable molding powder compositions for introduction to suitable molds. More importantly the cured, molded friction pads, disks, etc., possess superior heat-resisting and heat-dissipating properties which improve the durability and wear properties over prolonged periods of use.

These and other advantages are produced by the addition of a suitable proportion of microbeads of barium titanate glass, up to about 70 $\mu$ in diameter, to a conventional curable friction molding composition in dry particulate form, and mixing to form a uniform, homogeneous composition. The microbeads function physically to substantially improve the mixability of the composition and to produce a dry composition which is flowable and pourable and which has leveling properties, to fill all areas of a mold and to level to a uniform thickness. The homogeneity of the dry composition assures the uniform distribution of all of the important ingredients, including the curable phenolic binder material, such as a cresol novolak resin, to produce a cured, molded friction pad or disk having uniform strength and friction properties and excellent adhesion or bonding properties to a support.

Pure barium titanate is a clear crystalline ceramic having a refractive index of 2.40 and a melting point of 1625° C. Barium titanate microbeads are dense clear spheres, consisting primarily of $BaTiO_3$, but also containing substantial concentrations of $SiO_2$, $B_2O_3$ and CaO, as well as traces of other metal oxides. These beads are produced in conventional manner. They have high specific heat and thermal conductivity properties and low thermal expansion properties. They conduct or transport thermal energy or heat from regions of higher temperature to regions of lower temperature by increased motions of the fundamental particles within the crystalline lattice (electrons, ions, molecules) in rotational and vibrational modes. Electronic conduction substantially improves thermal conductivity. We have discovered that these chemical properties, combined with the physical properties of barium titanate in the form of microbeads having diameters up to about 70 $\mu$, more preferably between about 10 $\mu$ and 35 $\mu$, substantially improve the physical and thermal properties of conventional curable moldable friction compositions resulting in the production of homogeneous dry powder compositions which are flowable or pourable and self-leveling to fill the mold being used, to the exclusion of air pockets or voids, and which are heat-curable and compressible to form molded friction pads, disks, blocks, etc., having high heat conductivity and dissipation, properties which reduce and stabilize the temperature of the friction element over prolonged periods of use and thereby reduce its wear and increase its duration of useful performance. Temperatures above 200° C. are the prime enemy of friction elements such as brake and clutch linings, and the barium titanate microbeads provide the controlled or regulated heat-dissipation properties necessary to minimize heat build-up or accumulation above about 200° C. in the friction element during use, thereby reducing wear and increasing its useful life. Moreover, the barium titanate microbeads in the friction element appear to reduce the thermal effects of friction because of their spherical geometry and hardness, thereby reducing heat-generation, as well as minimizing heat accumulation due to their vitreous nature and heat-conducting properties. The barium titanate microbeads also are inert, oxidation-resistant, non-reactive with the resin binder and other ingredients, and impart flexibility to the molded friction element by virtue of their low aspect ratio.

The present microbeads substantially improve the properties of all conventional friction compositions. These include organic friction compositions which generally comprise about 30–40% resin binder, more than 40% fiber and the balance property modifiers; semi-metallic friction compositions which generally comprise more than 50% iron powder plus steel fiber and a minor amount of resin binder; and sintered and carbon metal-bonded ceramics (cermet) used for heavy duty vehicles and aircraft.

In operation, a brake pad, caliper or clutch disk is pressed into contact with a wheel drum, a rotor or a transmission plate to convert the kinetic energy of the moving member into heat generated by frictional engagement as the movement is slowed and stopped. The generated heat is gradually dissipated into the atmosphere and/or conducted into the moving member during periods of engagement. More efficient heat dissipation and heat conduction reduces heat accumulation and temperature increases within the friction element and reduces the rate of wear of the friction element during use. The addition of barium titanate microbeads reduces frictional forces between the surface of the present friction elements and the moving metallic surface which they engage, thereby reducing the amount of heat generated. The microbeads also substantially improve the heat-dissipation and heat-conductivity properties of the friction elements, allowing more rapid heat escape and lower temperature operation of the friction elements, resulting in reduced wear and extended operational life.

The following examples are given as illustrative of a variety of friction element compositions and manufacturing processes within the present invention, but should not be considered as being limitative.

EXAMPLE 1

A semi-metallic brake pad composition can be produced by uniformly dry mixing the following ingredients in comminuted form:

| Ingredients | Vol % | Range |
| --- | --- | --- |
| Phenolic resin binder | 25 | 10–40 |
| Sponge iron powder | 15 | 10–20 |
| Graphite powder | 25 | 20–40 |
| Mullite ceramic powder | 10 | 0–20 |
| Steel fibers | 10 | 0–20 |
| Barium titanate beads (10 to 20 $\mu$) | 15 | 10–25 |

The mixture is poured into a mold or formed into a desired shape, heated to cure the resin binder and form a desired friction element such as a brake pad.

EXAMPLE 2

A friction composition can be produced by uniformly mixing and blending the following powder ingredients:

| Ingredients | Parts by Weight | Range |
|---|---|---|
| Resin binder (phenolic) | 40 | 5–55 |
| Filler (clay) | 20 | 5–60 |
| Fiber (graphite) | 20 | 5–40 |
| Friction modifier (Cashew nut shell oil) | 10 | 5–40 |
| BaTiO$_3$ microbeads (10–20 $\mu$) | 10 | 5–30 |

The phenolic resin, which contains a curing agent, is mixed with the other ingredients and the composition is poured into a mold and heated under pressure to cure the binder material and form a hot-pressed friction element.

EXAMPLE 3

| Ingredients | Vol % | Range |
|---|---|---|
| Reinforcing material (steel fiber powder) | 30 | 10–50% |
| Friction modifier (rubber powder) | 5 | 0–10% |
| Solid lubricant (graphite powder) | 20 | 10–30% |
| Filler (barium sulphate powder) | 15 | 5–20% |
| Phenolic resin binder (thermosetting) | 20 | 10–30% |
| BaTiO$_3$ microbeads (10–15 $\mu$) | 10 | 5–20% |

The above ingredients may be mixed to form a homogeneous composition and poured into a mold and heated under pressure to cure the binder material and form a friction element according to the present invention.

Suitable binder materials for use in the present compositions preferably include the thermosetting phenolic resins, including cresylic resins, which are resistant to elevated temperatures, are commercially-available in powdered form and are cross-linkable and usable at elevated temperatures. These preferred polymers include cyanated phenolic resins, and phenol triazine (melamine) resins, in amounts between about 3% and 60% by weight.

Suitable alternative friction modifier or lubricant powders include iron oxides, magnesium oxide, aluminum powder, molybdium disulfide and graphite, in amounts between about 1% and 50% by weight.

Suitable alternative fiber powder materials include synthetic fibers, metal fibers and ceramic fibers such as thermotropic polymers including aromatic polyester polymers, graphite fibers, carbon fibers, aramid fibers, nylon fibers, etc., in amounts between about 0.1% up to about 50% by weight.

The present barium titanate microbeads have an average diameter up to about 70$\mu$, more preferably between about 5 and 50$\mu$ and most preferably between about 10 and 35$\mu$. The microbeads are added in amounts between about 1% and 40% by weight of the total composition, more preferably between about 5% and 30% by weight and most preferably between about 8% and 20% by weight.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A molded friction element having improved heat-dissipation and heat-conduction properties comprising a friction composition containing a plurality of microbeads of barium titanate glass having a diameter up to 70$\mu$ and a content up to 40% by weight.

2. A molded friction element according to claim 1 in which the friction composition further includes a cured thermoset resin binder material in an amount between about 3% and 60% weight.

3. A molded friction element according to claim 2 in which the resin binder material is a phenolic resin.

4. A molded friction element according to claim 2 in which the friction composition further includes one or more additives selected from the group consisting of friction modifiers, lubricants, reinforcing fibers and filler materials.

5. A molded friction element according to claim 4 containing between about 8% and 20% by weight of barium titanate glass microbeads having an average diameter between about 10$\mu$ and 35$\mu$.

6. A molded friction element having improved heat-dissipation and heat-conduction properties comprising a friction composition containing about 3% to 60% by weight of a cured thermoset resin binder material, about 1% to 50% by weight of one or more friction modifiers or lubricants, about 0.1% to 50% by weight of one or more reinforcing fibers, about 3% to 60% by weight of one or more filler materials and between about 8% and 20% by weight of barium titanate glass microbeads having an average diameter between about 10$\mu$ and 35$\mu$.

7. A molded friction element according to claim 6 in which the resin binder material comprises a phenolic resin.

8. A flowable, pourable dry powder composition for molding friction elements having improved heat-dissipation and heat-conduction properties comprising a friction molding powder composition containing a plurality of microbeads of barium titanate glass having a diameter up to 70$\mu$ and a content up to 40% by weight.

9. A molding powder composition according to claim 8 in which the friction composition further includes a curable thermosetting resin binder material in an amount between about 3% and 60% weight.

10. A molding powder composition according to claim 9 in which the resin binder material is a phenolic resin.

11. A molding powder composition according to claim 9 which further includes one or more additives selected from the group consisting of friction modifiers, lubricants, reinforcing fibers and filler materials.

12. A molding powder composition according to claim 8 containing between about 8% and 20% by weight of barium titanate glass microbeads having an average diameter between about 10$\mu$ and 35$\mu$.

13. A molding powder composition for molding friction elements having improved heat-dissipation and heat-conduction properties comprising a flowable, pourable dry powder friction composition containing about 3% to 60% by weight of a curable thermosetting resin binder material, about 1% to 50% by weight of one or more friction modifiers or lubricants, about 0.1% to 50% by weight of one or more reinforcing fibers, about 3% to 60% by weight of one or more filler materials and between about 8% and 20% by weight of barium titanate glass microbeads having an average diameter between about 10$\mu$ and 35$\mu$.

14. A method for producing friction elements having improved heat-dissipation and heat-conduction properties comprising mixing with a dry powder friction composition a plurality of microbeads of barium titanate glass having a diameter up to 70μ and a content up to 40% by weight to form a pourable homogeneous dry powder composition, and molding said composition to form a friction element.

15. A method according to claim 14 which comprises adding to the friction composition a curable thermosetting resin binder material in an amount between about 3% and 60% weight.

16. A method according to claim 15 in which the resin binder material is a phenolic resin.

17. A method according to claim 14 in which the dry powder friction composition includes one or more additives selected from the group consisting of friction modifiers, lubricants, reinforcing fibers and filler materials.

18. A method according to claim 14 comprising mixing between about 8% and 20% by weight of barium titanate glass microbeads having an average diameter between about 10μ and 35μ into the dry powder friction composition.

19. A method for producing friction elements having improved heat-dissipation and heat-conduction properties comprising mixing with a dry powder friction composition containing about 3% to 60% by weight of a curable thermosetting resin binder material, about 1% to 50% by weight of one or more friction modifiers or lubricants, about 0.1% to 50% by weight of one or more reinforcing fibers, about 3% to 60% by weight of one or more filler materials between about 8% and 20% by weight of barium titanate glass microbeads having an average diameter between about 10μ and 35μ, and molding said composition at elevated temperatures to cure said resin binder material and from a molded friction element.

20. A method according to claim 19 in which the resin binder material comprises a phenolic resin.

* * * * *